(12) United States Patent
Schwarze

(10) Patent No.: US 8,528,277 B2
(45) Date of Patent: Sep. 10, 2013

(54) PHOTOVOLTAIC PLANT WITH REFLECTOR ELEMENTS

(75) Inventor: Sascha Oliver Schwarze, Berlin (DE)

(73) Assignee: Solon SE, Berlin (DE)

( * ) Notice: Subject to any disclaimer, the term of this patent is extended or adjusted under 35 U.S.C. 154(b) by 499 days.

(21) Appl. No.: 12/911,787

(22) Filed: Oct. 26, 2010

(65) Prior Publication Data
US 2011/0100422 A1 May 5, 2011

(30) Foreign Application Priority Data
Oct. 30, 2009 (DE) .......................... 10 2009 051 766

(51) Int. Cl.
*E04D 13/18* (2006.01)

(52) U.S. Cl.
USPC .............. 52/173.3; 52/18; 126/623; 136/244

(58) Field of Classification Search
USPC ................. 52/173.3, 549; 248/316.4, 316.7; 126/621–623; 136/244, 251, 291
See application file for complete search history.

(56) References Cited

U.S. PATENT DOCUMENTS

| 4,674,244 A | 6/1987 | Francovitch |
| 5,511,537 A | 4/1996 | Hively |
| 5,953,869 A * | 9/1999 | Balfour et al. .................. 52/200 |
| 6,099,842 A * | 8/2000 | Pastan et al. ................ 424/183.1 |
| 2009/0114269 A1* | 5/2009 | Fletcher et al. ................ 136/251 |
| 2010/0000165 A1 | 1/2010 | Koller |
| 2010/0038507 A1 | 2/2010 | Schwarze et al. |

FOREIGN PATENT DOCUMENTS

| DE | 203 01 389 U1 | 3/2004 |
| DE | 10 2006 042 808 A1 | 3/2008 |
| DE | 10 2007 045 554 B3 | 3/2009 |
| DE | 10 2008 037 964 A1 | 2/2010 |
| EP | 1 306 907 A1 | 5/2003 |
| EP | 2 075 853 A2 | 7/2009 |
| JP | 2000 064 523 A | 2/2000 |
| WO | WO 2008/ 016 453 A2 | 2/2008 |

* cited by examiner

Primary Examiner — William Gilbert
Assistant Examiner — Patrick Maestri
(74) Attorney, Agent, or Firm — Leydig, Voit & Meyer, Ltd.

(57) ABSTRACT

A photovoltaic plant includes a plurality of longitudinal solar panels, a plurality of longitudinal reflector sheets, and a plurality of bending-resistant clamping strips. The plurality of longitudinal solar panels are disposed with mounting rails on a substantially horizontally orientated flat substrate at a predetermined angle and in parallel rows with a predetermined spacing to one another. The plurality of longitudinal reflector sheets are arranged between the rows of the solar panels. The clamping strips are disposed in a spaced vertical arrangement between the mounting rails on a back of the solar panels. Each of the clamping strips are configured to connect an upper edge of a respective one of the solar panels to an upper edge of an adjacent first reflector sheet of the reflector sheets and a lower edge of the respective solar panel to a lower edge of an adjacent second reflector sheet of the reflector sheet.

14 Claims, 3 Drawing Sheets

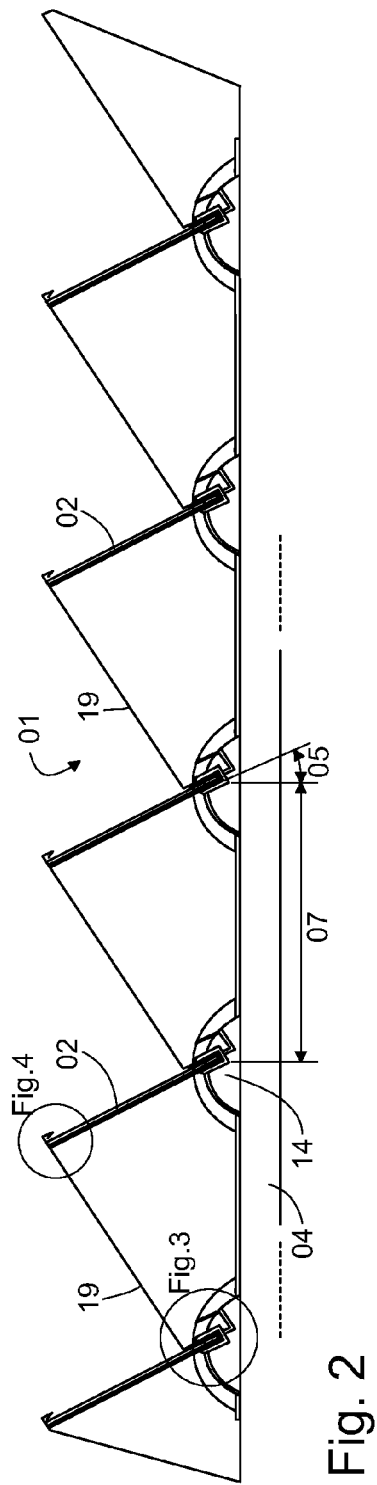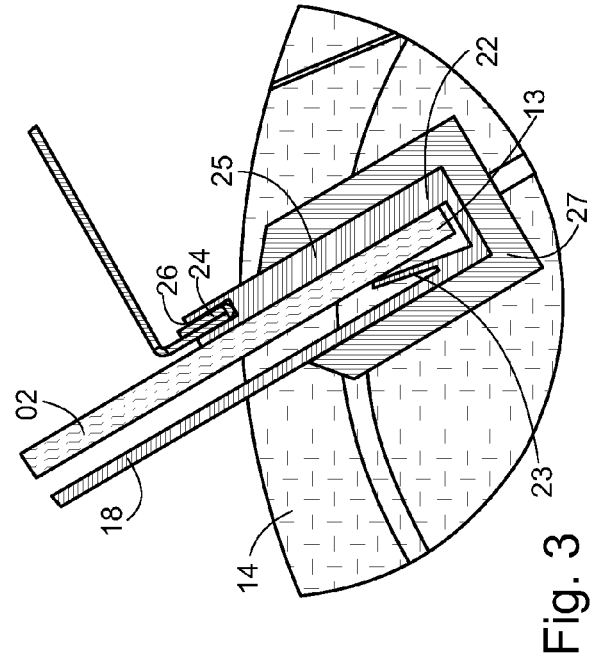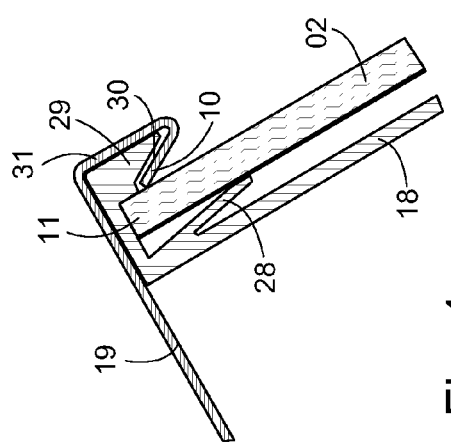

PHOTOVOLTAIC PLANT WITH REFLECTOR ELEMENTS

CROSS REFERENCE TO PRIOR APPLICATION

This patent application claims priority to DE 10 2009 051 766, filed on Oct. 30, 2009, which is hereby incorporated by reference herein in its entirety.

FIELD

The invention relates to photovoltaic plants with longitudinal solar panels and longitudinal reflector elements.

BACKGROUND

Reflectors in photovoltaic systems are used for the better exploitation of irradiated sunlight by means of the backscattering onto the solar cells. In this case, the reflectors can for example be arranged in the module below the solar cells, so that the reflected light is reflected once more on the glass plate of the module, but bifacial solar cells with two active surfaces can also be provided. Alternatively, rows of solar cells can also be built up, between which rows of reflectors are then located, wherein solar cells and reflectors are arranged at a corresponding angle to one another so that a substantially stepped construction results, as is known in principle from U.S. Pat. No. 5,511,537 A or WO 2008/016 453 A2.

A stackable flat/floor rack for solar panels made up of a wire mesh, which has two angled faces, is known from DE 10 2007 045 554 B3. Solar panels are then applied onto the flat angled face and wind baffle plates are applied onto the more steeply angled face to hold down the racks, wherein the wind baffle plates have reflective surfaces and thus can be used as reflector elements.

A device described as a solar roof is known from DE 10 2006 042 808 A1, in which solar modules and bending-resistant reflection faces are connected alternately to a leak-proof roof face, for example for roofing a car parking space. The solar roof must be mounted on a suitable substructure in order to be able to withstand snow and wind loads. The reflection faces are connected to the adjacent solar modules in a manner which is not described in any more detail. Water drainage lines can be provided at the lower connections.

A photovoltaic arrangement is known from EP 2 075 853 A2, which connects solar modules and reflection faces alternately in such a manner that the reflection faces reflect sun rays, which otherwise fall into the gap between the installations of the solar modules, onto the nearest solar module. The arrangement, which is provided for installation on flat substrates, requires a supporting substructure. The reflection faces are connected to the adjacent solar modules in a manner which is not described in any more detail.

A supporting structure for solar modules is known from U.S. Pat. No. 4,674,244 A, which has a triangular cross section in order to orientate the solar modules optimally towards the sun. The supporting structure is provided for installation on flat substrates and can carry reflective films on its back, which reflect light rays which fall into the gap between the solar modules onto the nearest solar module. The reflecting faces are adhesively bonded films, a fixing on the solar modules themselves is not provided.

EP 1 306 907 A1 describes a photovoltaic plant with longitudinal solar panels is described, which are arranged by means of mounting rails on a flat, essentially horizontally orientated flat substrate at a set angle and in parallel rows with a spacing to one another. Independent, complex frame constructions with side walls and a concave face—in turn primarily for reducing loads due to the action of the wind—are provided between the rows made up of solar panels. The concave faces can have a reflective surface and are therefore also constructed as reflector elements. These are arranged at the back between the rows of the solar panels in such a manner that in each case the upper edges and the lower edges of the solar panels and reflector elements are connected to one another. As a result, a closed construction (which therefore offers little area for the action of the wind) results, in which the solar panels are irradiated by the reflector elements and not covered. In this case, the connection to the upper edges takes place by means of simple clips, the connection at the lower edges by means of a batten. No further statement is made about the strength of the connections. Furthermore, the solar panels lie concavely between upper and lower edges over the entire row length, so that here sagging can occur, if appropriate, in the case of a thin laminate design. The reflector elements are, as already stated, realised as complex space elements.

A solar cell bracket in the form of a basin is known from DE 203 01 389 U1, on which the solar panel is fixed with the aid of two opposite catches. In this case, the catches have angled portions for the connection of solar panels and the basin, wherein these do not surround the solar panels. Furthermore, the opposite catches are connected to a web which at the same time is used for supporting the solar panels. Thus, thin, frameless laminates can also be used without sagging occurring.

A mounting device for longitudinal solar modules is known from JP 2000 064 523 A, which essentially consists of mounting rails arranged on the flat substrate and insert elements fixed thereto made up of two separate metal brackets of different arm length. Each metal bracket has a dual bend at its upper end for the lateral insertion of the solar modules with their two longitudinal peripheral regions. The solar modules are thus also fixed on both sides—as for all solar modules previously—and known from the prior art. To avoid damage of the solar modules, bands (ibid. reference number 71 in FIG. 7), which surround the solar modules on both edges and run on the back, are provided on the solar modules in the region of the metal brackets to be arranged. These bands are realised in an elastic manner however and are used exclusively for interposition between the solar panels and the metal brackets of the insertion element. Reflector elements are not provided in both of the previously mentioned arrangements.

SUMMARY

In an embodiment, the present invention provides a photovoltaic plant including a plurality of longitudinal solar panels, a plurality of longitudinal reflector sheets, and a plurality of bending-resistant clamping strips. The plurality of longitudinal solar panels are disposed with mounting rails on a substantially horizontally orientated flat substrate at a predetermined angle and in parallel rows with a predetermined spacing to one another. The plurality of longitudinal reflector sheets are arranged between the rows of the solar panels. The clamping strips are disposed in a spaced vertical arrangement between the mounting rails on a back of the solar panels. Each of the clamping strips are configured to connect an upper edge of a respective one of the solar panels to an upper edge of an adjacent first reflector sheet of the reflector sheets and a lower edge of the respective solar panel to a lower edge of an adjacent second reflector sheet of the reflector sheet. Each of the clamping strips include an upper angled portion. The upper angled portion has an upper front arm and a first fixing device configured to fix the adjacent first reflector sheet. The upper angled portion is configured to receive the respective solar panel at the upper edge thereof. Each of the clamping strips include a lower angled portion. The lower angled portion has a lower front arm and a second fixing device configured to fix the adjacent second reflector sheet. The lower angled portion is configured to receive the respective solar panel at the upper edge thereof.

BRIEF DESCRIPTION OF THE DRAWINGS

An embodiment of the photovoltaic plant with reflector elements according to the invention is explained in more detail below with reference to the accompanying figures.

FIG. 2 shows a side view of the photovoltaic plant according to the invention, FIG. 3 shows a first detail from FIG. 2, FIG. 4 shows a second detail from FIG. 2.

DETAILED DESCRIPTION

Figure 1:
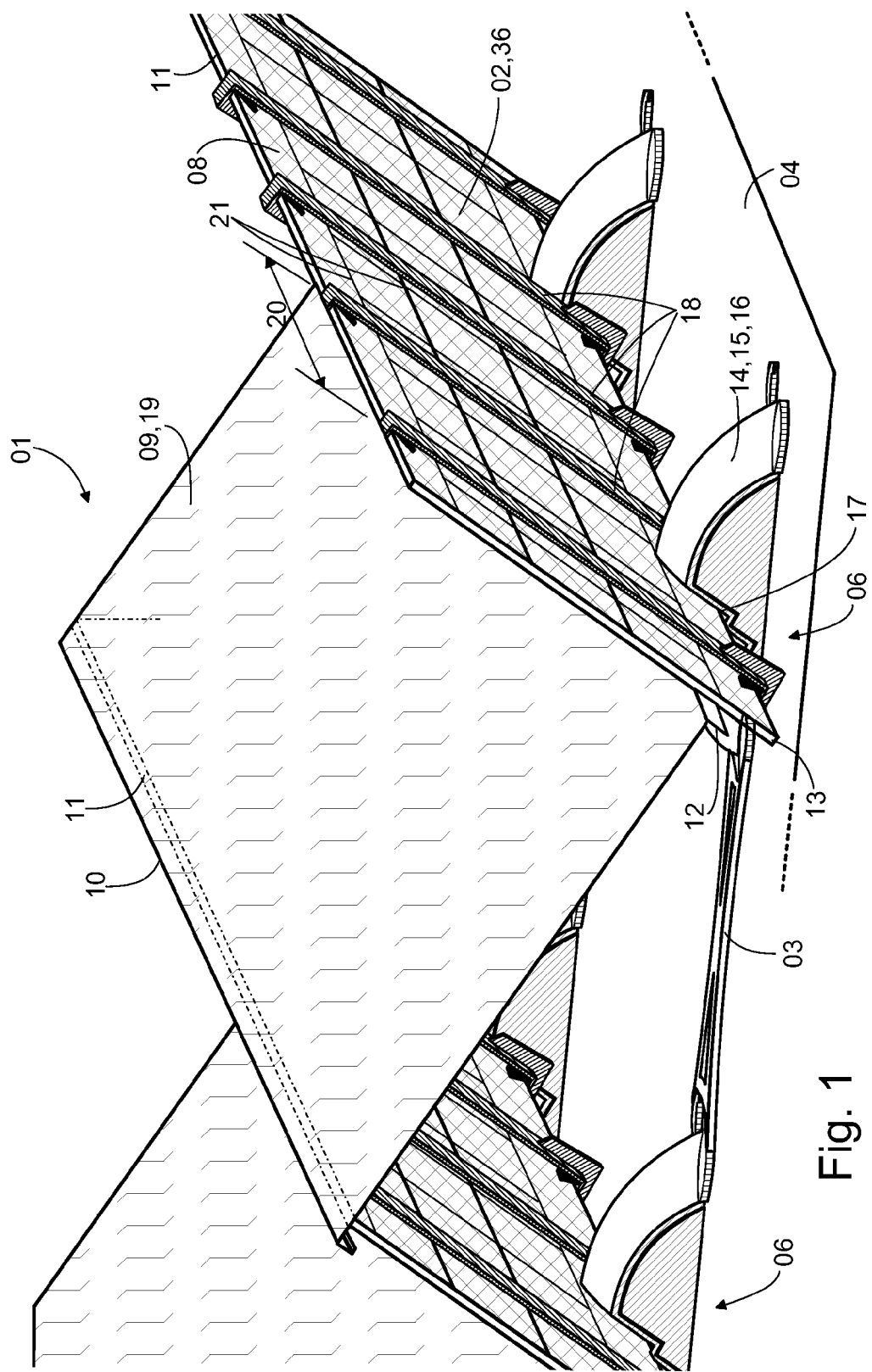
FIG. 1 shows a perspective detail view of the photovoltaic plant according to the invention.

The invention provides a photovoltaic plant with longitudinal solar panels which are arranged by means of mounting rails on an essentially horizontally orientated flat substrate at a set angle and in parallel rows with a spacing to one another, and with longitudinal reflector elements arranged at the back between the rows of the solar panels with a connection of the upper edge of the reflector element to the upper edge of the solar panel and the lower edge of the reflector element to the lower edge of the solar panel.

As horizontal flat substrates, light-weight flat roofs generally can no longer support standard solar modules orientated optimally towards the sun on account of insufficient load reserves, so that in terms of solar technology, these surfaces are often used not at all or only with flat and therefore yield-diminished solar modules. In order to keep the loads acting on solar modules arranged in an inclined manner as low as possible, these can be built so small in terms of their height as still makes sense from a technical and economic standpoint. So, for example, only one more solar cell strings can be connected to a longitudinal solar module. In the case of the same installed electric power, this is installed more evenly on the flat roof by means of the parallel installation of many one-string solar modules with low area loads compared to standard solar modules with high local area load. However, also a few solar cell rows next to one another ("multi-string solar module" in contrast to a "many-string solar module") still produce very narrow longitudinal solar modules with a large aspect ratio, that is to say with a large length compared to their height ("board-shaped" configuration). Solar modules or solar panels of this type are designated in the present context with "longitudinal". Solar modules can have solar cells on panes of glass in constructive frames or also "laminated" solar cells cast in plastic. Solar modules with laminated solar cells can also be designated as "solar panels" and are relatively thin and often bendable.

The present invention provides a generic photovoltaic system in which a simple and light mounting of the longitudinal solar panels is possible. Furthermore, a particularly simple, yet in spite of this windproof nature and fixing of the reflector elements should also be implemented. In this case, the reflector elements themselves should be realised as simply as possible, yet also effectively in terms of their reflection action. In both cases, however, the solar panels should in this case be protected effectively from sagging, without an impairment of their effective face.

The photovoltaic system according to the invention is characterised on the one hand by an exclusively one-sided mounting of the solar panels in the region of their lower edges on the mounting rails on the flat substrate. On the other hand, the invention is characterised by bending-resistant reflector clamping strips which are used for fixing the reflector elements, principally however also for the stabilisation of the solar panels. To this end, the reflector clamping strips are realised in a manner resistant to bending and arranged on the back of the solar panels with spacing to one another between the mounting rails, so that they do not hinder the mounting of the solar panels. To accommodate the solar panels, the reflector clamping strips have upper and lower dual angled portions, with the front arms of which they in each case surround the solar panels at their two longitudinal edges. The reflector elements themselves are realised as simple thin reflector sheets. Due to the one-sided mounting of the solar panels, these are substantially simpler to mount and also better accessible than known solar panels, which is particularly advantageous for a simple fixing of the reflector elements. In the case of a one-sided fixing, the solar panels do not have the stability as in the case of a two-sided fixing because the upper edge of the solar panels is unsupported. Fixing of reflector elements with exclusive supporting on the upper edge of the solar panels would therefore lead to an undesired sagging. Therefore, in the case of the invention, the bending-resistant reflector clamping strips are provided, which surround the solar panels, which can preferably be frameless PV laminates, from the back at the upper and lower edges. Due to the vertical running of the bending-resistant reflector clamping strips and due to their adjacent arrangement over the entire longitudinal extent of the solar panels, in the invention these are stabilised in a most simple, yet also most effective manner and protected from sagging. As a result, the stability loss due to the one-sided fixing, which is not particularly great in the case of longitudinal solar panels however, is compensated. An exceptionally stable composite made up of solar panels and bending-resistant reflector clamping strips is created, which can even withstand relatively large loads due to the action of the wind without any problems. In this case, the bending-resistant reflector clamping strips are provided between the mounting rails and therefore do not disturb the fixings of the solar panels in the region of their lower edge. The reflector elements are used for the fixing of the reflector elements, which are realised in a particularly simple manner as thin reflector sheet. Spatial constructions are dispensed with. The arrangement and secure connection of the reflector sheets is achieved exclusively by means of their fixing to the upper edge of the one solar panel and to the lower edge of the solar panel located therebehind in the next row.

For good stabilisation of the solar panels and for secure fixing of the reflector sheets, a plurality of bending-resistant reflector clamping strips are, according to the invention, provided over the longitudinal extent of the solar panels. In order to ensure a constant spacing between the bending-resistant reflector clamping strips and reliably prevent their lateral slipping, it is furthermore advantageous if a connection element is provided on the back of the solar panels arranged parallel to their upper and lower edges, which connection element connects all bending-resistant reflector clamping strips on the back of a solar panel to one another. Here, this can be a simple strip which has dual clamping catches in the region of the bending-resistant reflector clamping strips. A simple connection by means of adhesive bonding or other simple connection technologies is likewise possible.

The bending-resistant reflector clamping strips are used in the case of the invention particularly for the stabilisation of the solar panels which are fixed on one side. For the secure connection to these, the bending-resistant reflector clamping strips surround the solar panels with the front arms of upper and lower dual angled portions. The solar panels therefore plug into the dual angled portions, as into guiding grooves. The mounting of the bending-resistant reflector clamping strips takes place in a simple manner by means of simple slipping on of the narrow sides of the solar panels or by means of adjustment by means of a length adjustment. So that the front arm of the reflector clamping strip is not bent away under the action of the wind and the guide of the solar panels is widened, it is advantageous if the bending-resistant reflector clamping strip has a rib reinforcement at least in the region of the lower angled portion. Here, this can be a single, centrally arranged and radially directed rib, for example.

Construction of the bending-resistant reflector clamping strips out of a plastic, for example a hard plastic, can simplify the mounting on the solar panel if the bending-resistant reflector clamping strips are pushed laterally onto the solar panels. Alternatively, the bending resistant reflector clamping strips can also have a rigid length setting. In the extended position, they are then pushed over the solar panel and then accommodate the same after the pushing together in the shortened position in their upper and lower angled portions. For better and non-releasable fixing of the solar panels in the interior of the bending-resistant reflector clamping strips, clamping lips can furthermore be preferably provided within the lower and/or upper dual angled portion of the reflector clamping strips. This embodiment is preferably to be seen in connection with a realisation of the bending-resistant reflector clamping strips out of plastic so that the clamping lips bring the required flexibility.

The reflector elements are realised as simple thin reflector sheets in the invention. Preferably, these can be thin sheets made of a metal or plates or films made from a plastic. All reflector sheets have a reflective surface in their function as reflectors. In this case, the natural reflectivity of the material used or an additional reflective coating can be used. In the case of the use of a metal sheet as reflector sheet, this can have simple angled portions at the upper and lower edge. With the lower edge, the sheet is pushed simply between the bending-resistant reflector clamping strip and the solar panel and clamped there. With the angled upper edge, the sheet is then simply laid over the upper edge of the solar panel and fixed there, if appropriate. Special means for accommodating the reflector sheets can also be provided at the bending-resistant reflector clamping strip. In this case, this can preferably be a first accommodation groove in the end face of the front arm of the lower angled portion for accommodating the lower edge of the reflector sheet. The angled portion of the reflector sheet, which is if appropriate folded once more, is simply pushed into this accommodation groove. Furthermore, an inner chamfer of the front arm of the upper angled portion can be provided for accommodating the angled upper edge of the reflector sheet. To this end, the reflector sheet is preferably angularly folded twice and simply locks behind the chamfer when pushed over. Alternatively, a second accommodation groove can also be located on the back of the bending-resistant reflector clamping strip in the region of its upper angled portion for accommodating the upper edge of the reflector sheet. The reflector sheet can for example have a thickening at its upper edge, with which it then locks into the accommodation groove.

An advantage of the photovoltaic system according to the invention is the one-sided fixing of the solar panels only in the region of their lower edges, as a result of which the solar panels can be mounted better and are accessible. A stabilisation of the solar panels, which are fixed on one side, against sagging is achieved according to the invention by means of the bending-resistant reflector clamping strips. Advantageously, the one-sided holding of the solar panels can take place in insertion elements which are fixed in the mounting rails. Here, a construction of the insertion element as a compact one-piece moulded element with a closed surface can preferably be provided. In this case, the closed surface is only interrupted by an insertion slot which runs over the entire width of the moulded element at the predetermined set angle. The lower edge of the solar module is pushed into this insertion slot from above. The solar module is then fixed in the insertion slot by means of a mounting element made of plastic ("wedge"), which can be adjusted in terms of its thickness, which is likewise placed from above into the insertion slot. A mounting device of this type is known from publication number DE 10 2008 037 964 A1. Further constructive details of the invention can be seen from the special embodiment which is explained in more detail in the following.

FIG. 1 shows a photovoltaic plant 01 with longitudinal solar panels 02, for example frameless solar laminates 36, which are arranged on an essentially horizontally orientated flat substrate 04, for example a warehouse roof, by means of mounting rails 03 at a set angle 05 and in parallel rows 06 with a spacing 07 (see FIG. 2) to one another. Longitudinal reflector elements 09 are arranged between the rows 06 on the back 08 of the solar panels 02. The upper edges 10 of the reflector elements 09 are connected to the upper edges 11 of the solar panels 02. The lower edges 12 of the reflector elements 09 are connected to the lower edges 13 of the solar panels 02. Thus, a zig-zag shaped course of the rows 06 of solar panels 02 and reflector elements 09, which adjoin one another without gaps, results as viewed from the side. In this case, the reflector elements 09 in no way shadow the solar panels 02, but rather reflect the sunlight falling between the rows 06 made up of the solar panels 02 optimally onto the solar panels 02, so that the sunlight irradiated from above can be used optimally.

The solar panels 02 are mounted in the region of their lower edges 13 on one side in insertion elements 14 in the form of compact, one-piece moulded elements 15 with a closed surface 16 which is interrupted by an insertion slot 17, which runs at the predetermined set angle 05 over the entire width of the moulded element 15 and in which the solar panel 02, which is pushed in on one side using its lower edge 13, is fixed by means of a mounting element made from plastic (compare DE 10 2008 037 964 A1).

On the back 08 of the solar panels 02, in total five vertical bending-resistant reflector clamping strips 18 are provided in the exemplary embodiment shown for fixing the reflector elements 10, which are constructed in the case of the invention as thin reflector sheets 19, and for stabilising the solar panels 02 which are fixed on one side. The bending-resistant reflector clamping strips 18 are distributed with a spacing 20 evenly over the longitudinal solar panels 02 and arranged between the insertion elements 14. The bending-resistant reflector clamping strips 18 are connected to one another horizontally using a plurality of parallel connection elements 21. The supporting function of the bending-resistant reflector clamping strips 18 for the solar panels 02 which are only fixed on one side is clearly to be seen. Their sagging is no longer possible. At the same time, the bending-resistant reflector clamping strips 18 are used for the exclusive fixing of the reflector sheets 19, which is described in more detail below.

FIG. 2 shows the photovoltaic plant 01 in the side view. The gapless, zig-zag course of solar panels 02 and reflector sheets 19 is shown. Side view details from the region of the lower edges 12, 13 (FIG. 3) and the region of the upper edges 10, 11 (FIG. 4) of the solar panel 02 and the reflector sheet 19 are explained in more detail below.

In FIG. 3, the bending-resistant reflector clamping strip 18 is shown in the region of the lower edge 13 of the solar panel 02. A lower dual angled portion 22 for accommodating the solar panel 02 is shown. For the non-releasable fixing of the solar panel 02, the bending-resistant reflector clamping strip 18 has a lower clamping lip 23 in its interior. In the case of a production of the bending-resistant reflector clamping strip 18 from a plastic, the lower clamping lip 23 is correspondingly elastically realised. Furthermore, an accommodation groove 26 for accommodating the lower edge 12 of the reflector sheet 19 is provided in the end face 24 of the lower front arm 25 of the lower dual angled portion 22 of the bending-resistant reflector clamping strip 18, which surrounds the lower edge 13 of the solar panel 02. To reinforce the reflector sheet 19, the same is double-folded at its lower edge 12. Furthermore, a rib reinforcement 27 is provided in the region of the lower dual angled portion 22 of the reflector clamping strip 18, which ensures stabilisation of the lower dual angled portion 22 against bending up by means of wind loads acting on the solar panel 02.

FIG. 4 shows the bending-resistant reflector clamping strip 18 in the region of the upper edge 11 of the solar panel 02. An upper clamping lip 28 for the non-releasable fixing of the solar panel 02 at its upper edge 11 is shown. Furthermore, an inner chamfer 30 for accommodating the correspondingly angled upper edge 10 of the reflector sheet 19 is provided on the upper front arm 29 of the bending-resistant reflector clamping strip 18. Alternatively, the reflector sheet 19 can also engage with a corresponding thickening into a rear accommodation groove on the bending-resistant reflector clamping strip 18. In the exemplary embodiments shown, the reflector sheet 19 is produced from a relatively bending-resistant thin metal sheet. A flexible, yet tensioned configuration for example made from a metal or plastic film can likewise be readily used however.

Figure 5:
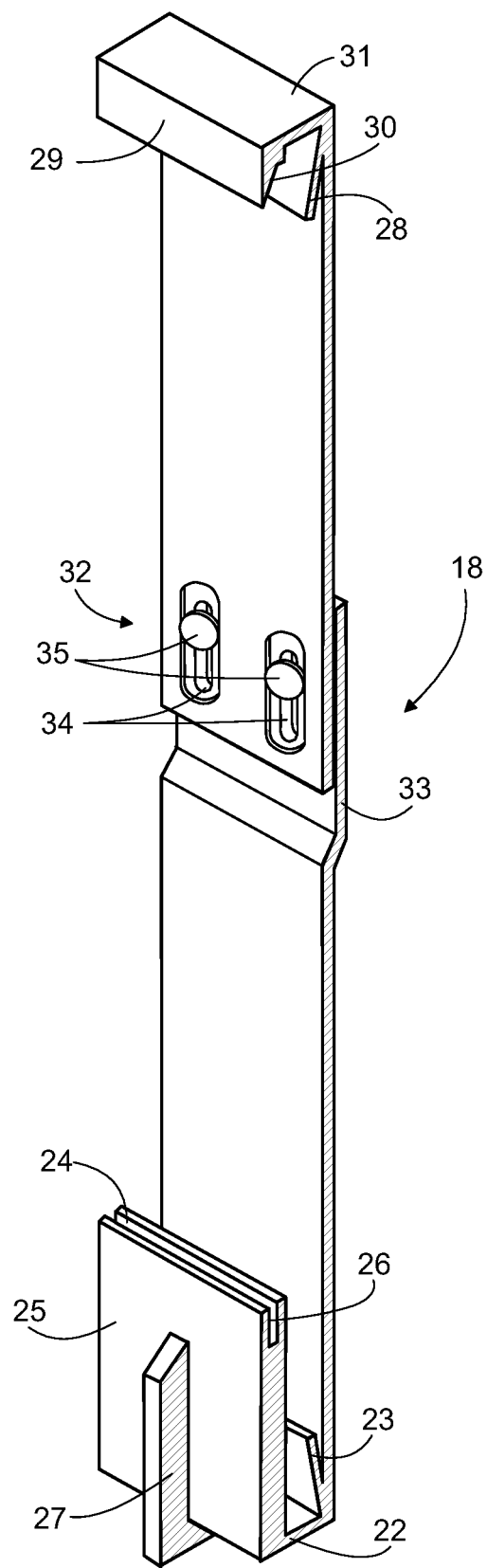
FIG. 5 shows a perspective view of the bending-resistant reflector clamping strip.

FIG. 5 shows only the bending-resistant reflector clamping strip 18 with its elements in a perspective view. The upper dual angled portion 31 with the inner chamfer 30 on the upper front arm 29 and the upper clamping lip 28 can be seen. In the region of the lower dual angled portion 22 of the bending-resistant reflector clamping strip 18, the accommodation groove 26 on the end face 24 of the lower front arm 25 and the lower clamping lip 23 and also the rib reinforcement 27 are shown. Furthermore, in FIG. 5, the bending-resistant reflector clamping strip 18 with a length setting 32 is shown (in the selected exemplary embodiment, a simple strap 33 with holes 35 and a screw fixing 36).

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SYMBOLS

01 Photovoltaic plant with longitudinal
02 Solar panels
03 Mounting rails
04 Flat substrate
05 Set angle
06 Parallel row of 02
07 Spacing between 06
08 Back of 02
09 Reflector element
10 Upper edge of 09, 19
11 Upper edge of 02
12 Lower edge of 09
13 Lower edge of 02
14 Insertion element
15 Moulded element
16 Closed surface
17 Insertion slot for 02
18 Bending-resistant reflector clamping strip
19 Reflector sheet
20 Spacing between 18
21 Connection element
22 Lower dual angled portion
23 Lower clamping lip
24 End face
25 Lower front arm
26 Accommodation groove
27 Rib reinforcement
28 Upper clamping lip
29 Upper front arm
30 Inner chamfer
31 Upper dual angled portion
32 Length setting
33 Strap
34 Hole
35 Screw fixing
36 Frameless solar laminate

What is claimed is:
1. A photovoltaic plant comprising:
a plurality of longitudinal solar panels disposed with mounting rails on a substantially horizontally orientated flat substrate at a predetermined angle and in parallel rows with a predetermined spacing to one another;
a plurality of longitudinal reflector sheets arranged between the rows of the solar panels; and
a plurality of bending-resistant clamping strips disposed in a spaced vertical arrangement between the mounting rails on a back of the solar panels, each of the clamping strips connecting an upper edge of a respective one of the solar panels to an upper edge of an adjacent first reflector sheet of the reflector sheets and a lower edge of the respective solar panel to a lower edge of an adjacent second reflector sheet of the reflector sheet, each of the clamping strips including an upper angled portion, the upper angled portion having an upper front arm and a first fixing device fixing the adjacent first reflector sheet, the upper angled portion being receiving the respective solar panel at the upper edge thereof, each of the clamping strips including a lower angled portion, the lower angled portion having a lower front arm and a second fixing device fixing the adjacent second reflector sheet, the lower angled portion being receiving the respective solar panel at the upper edge thereof.

2. The photovoltaic plant according to claim 1, wherein each of the clamping strips includes at least one connection element disposed at the back of the solar panels parallel to the upper and lower edges of the solar panels.

3. The photovoltaic plant according to claim 1, wherein each of the clamping strips includes a rib reinforcement in a region of the lower dual angled portion.

4. The photovoltaic plant according to claim 1, wherein the clamping strips are plastic.

5. The photovoltaic plant according to claim 1, wherein each of the clamping strips includes at least one of a lower clamping lip within the lower dual angled portion and an upper clamping lip within the upper dual angled portion.

6. The photovoltaic plant according to claim 1, wherein each of the clamping strips includes a first accommodation groove in the lower front arm of the lower angled portion for accommodating the lower edge of the adjacent second reflector sheet.

7. The photovoltaic plant according to claim 1, wherein each of the clamping strips includes an inner chamfer in the upper front arm of the upper angled portion for accommodating the upper edge of the adjacent first reflector sheet.

8. The photovoltaic plant according to claim 1, wherein each of the clamping strips includes an accommodation groove on a back of the clamping strip for accommodating the upper edge of the adjacent first reflector sheet.

9. The photovoltaic plant according to claim 1, wherein each of the clamping strips includes a rigid length setting device.

10. The photovoltaic plant according to claim 1, wherein the reflector sheets have at least one of a bending-resistant and flexible construction.

11. The photovoltaic plant according to claim 1, wherein the reflector sheets include at least one of sheets made of a metal, plates made of a plastic and films made of a plastic.

12. The photovoltaic plant according to claim 1, wherein the solar panels include a frameless solar laminate.

13. The photovoltaic plant according to claim 1, wherein the solar panels are each held on one side thereof by an insertion element fixed in the mounting rails.

14. The photovoltaic plant according to claim 1, further comprising an insertion element formed as a compact one-piece moulded element having a surface with an insertion slot, which runs at the predetermined set angle over an entire width of the moulded element and in which each of the solar panels is attached by a mounting element made of plastic.

* * * * *